United States Patent [19]

O'Donnell

[11] 4,393,545

[45] Jul. 19, 1983

[54] PROCESSING OF SEA URCHINS

[76] Inventor: Brian F. O'Donnell, 4 Nerissa St., Burwood, 31325, Victoria, Australia

[21] Appl. No.: 212,330

[22] Filed: Dec. 2, 1980

[30] Foreign Application Priority Data

Dec. 4, 1979 [AU] Australia .............................. PE1598

[51] Int. Cl.³ ............................................ A22C 29/04
[52] U.S. Cl. ...................................................... 17/76
[58] Field of Search .................. 17/76, 74, 75, 71, 66, 17/68, 69, 53

[56] References Cited

U.S. PATENT DOCUMENTS 3,126,576  3/1964  Johannesen ............................ 17/68

FOREIGN PATENT DOCUMENTS 873064  3/1942  France ..................................... 17/76
1464  of 1907  United Kingdom ..................... 17/75

*Primary Examiner*—Willie G. Abercrombie

*Attorney, Agent, or Firm*—Manfred M. Warren; Robert B. Chickering; Glen R. Grunewald

[57] ABSTRACT

A tool for cracking the shells of sea urchins, comprising a blade formed with central recess which enables the blade to penetrate the shell in the region of the mouth thereof without causing significant damage to the internal organs or roe of the sea urchin, and means for restraining the shell and for moving said blade laterally with respect to said restraining means to thereby open the shell. In its simplest form, the blade is formed at one end of one handle of a hand tool while the restraining means is formed at one end of a handle to which the first mentioned handle is pivoted to achieve said lateral movement of said blade. In a more sophisticated embodiment, the blade is mounted for vertical movement by means of a pneumatic cylinder and is arranged for lateral movement relative to the restraining means by means of a further pneumatic cylinder which operates when the blade is in the shell penetrating position.

8 Claims, 8 Drawing Figures

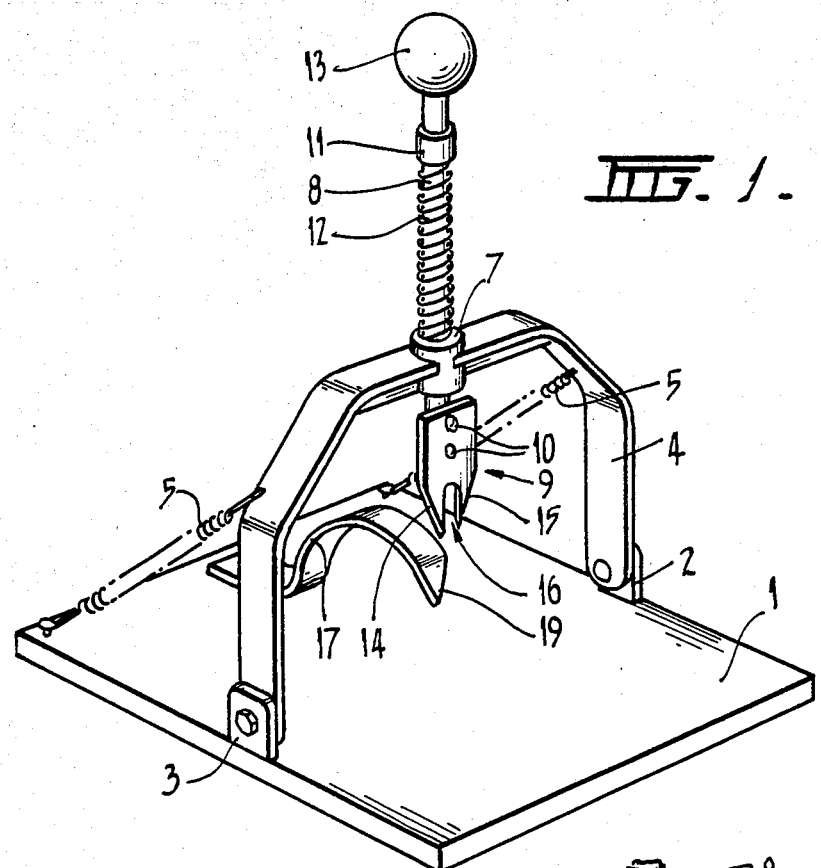
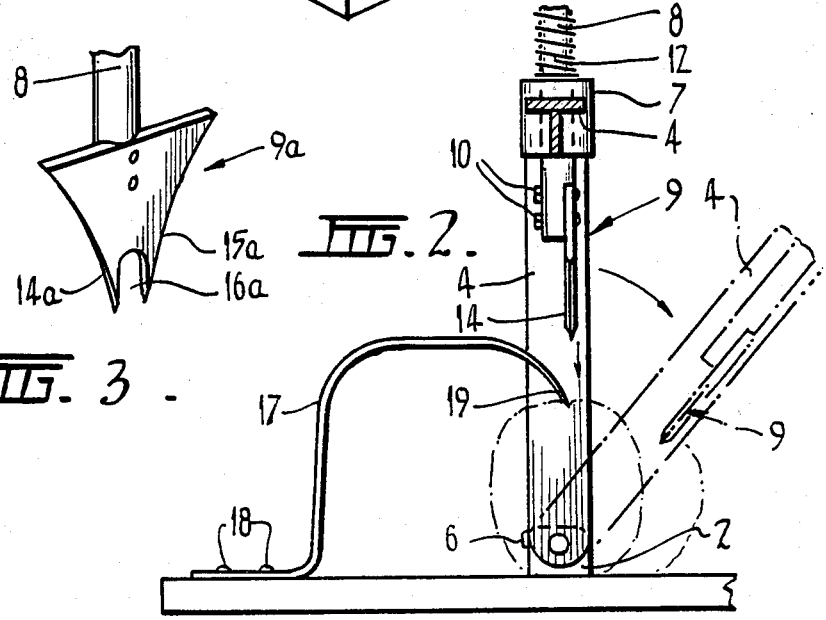

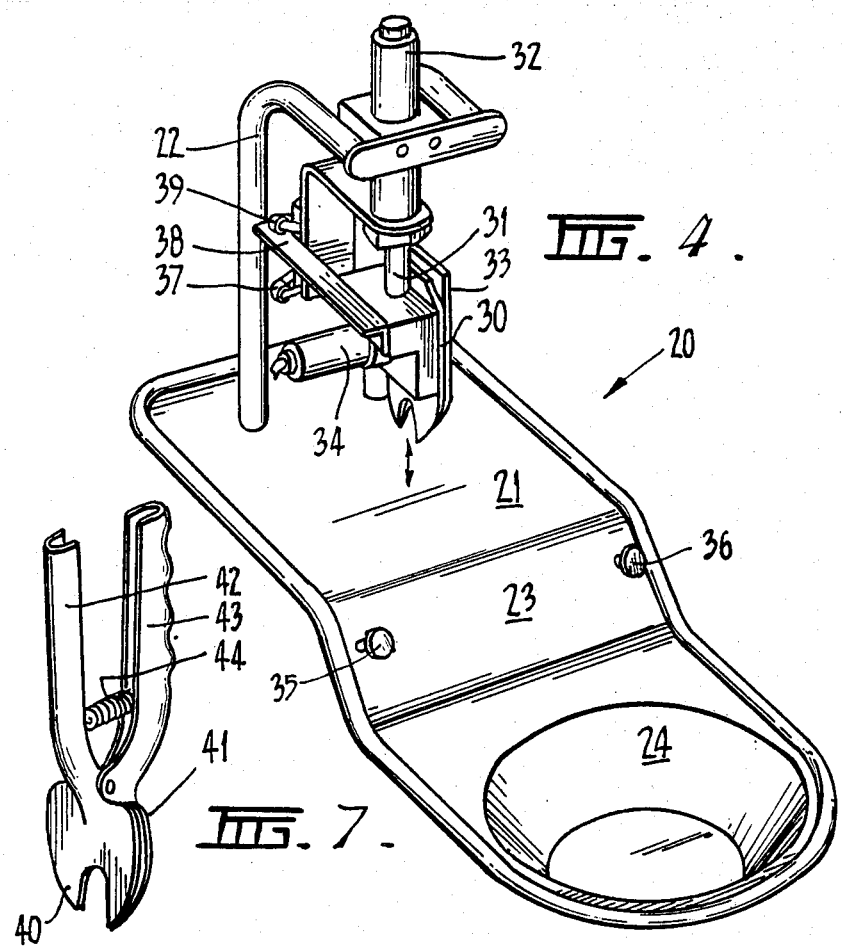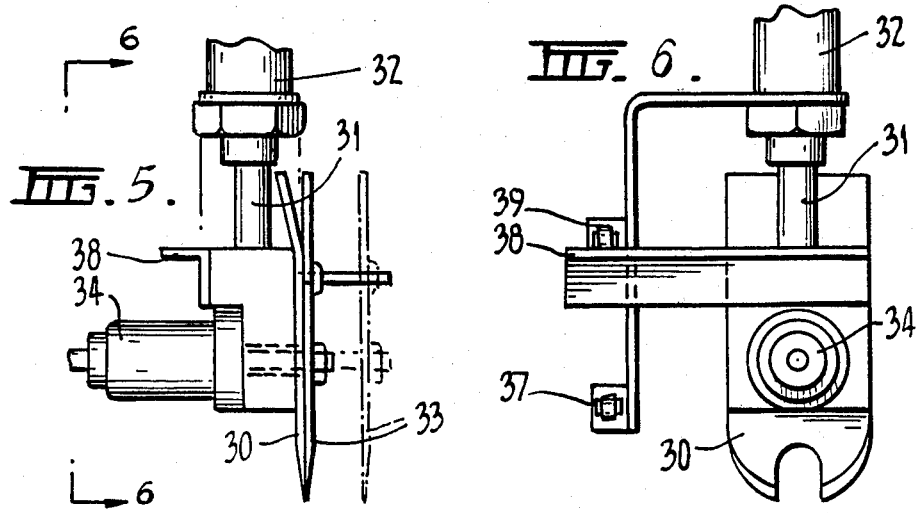

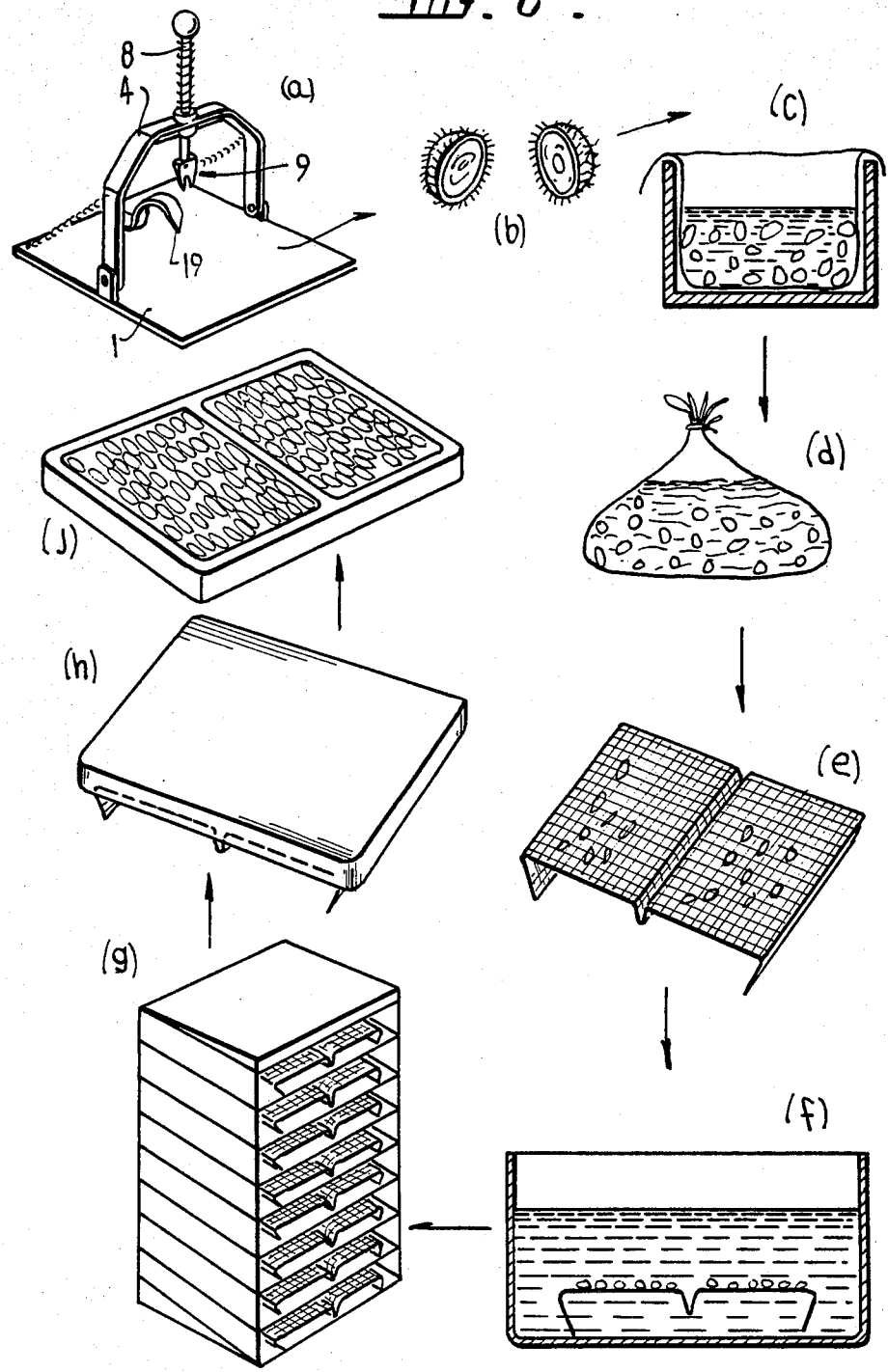

PROCESSING OF SEA URCHINS

This invention relates to the processing of sea urchins or other similar shelled creatures containing roe or flesh which can be recovered by cracking the shell open. The invention also relates to an improved tool for suitably cracking sea urchin shells and the like.

At the present time, sea urchins are harvested by divers, returned to land for processing and the extracted roe subsequently shipped, under cool storage conditions, to the consumer. Since sea urchin roe spoils extremely easily and has a very short shelf life, it is most important that the product reach the consumer in the shortest possible time.

The presently employed method of opening sea urchin shells involves the use of a hammer and a chisel-like special tool to crack the shell, followed by manual scooping of the roe from the shell halves using a blunt tool or a spoon. These operations depend greatly on the skill of the processor for the avoidance of damage to the roe and it is the experience of most processing operations that a significant proportion of the harvested urchins have their roe spoilt. The method is also extremely slow and labour intensive and as a result a considerable number of processors must be employed for each boat load of urchins in order to extract the roe and ship it to the consumer before it spoils.

It is one object of the present invention to provide an improved system of processing sea urchins and the like shelled creatures which substantially reduces the number of persons involved in the processing whilst reducing the time between harvesting and shipping to the consumer.

In a first aspect, the invention provides a system for processing sea urchins and like shelled creatures characterised by the steps of opening the shells of said creatures at sea by means of a shell cracking device while other said creatures are being harvested, removing the roe from the shells and storing said roe in a suitable solution for transport back to shore, whereupon the processing of the roe proceeds in the normal manner.

It has been found that by cracking the shells and removing the roe at sea, the processing time and labour content is substantially reduced. For example, it is believed that the system according to the invention will result in roe harvested in Victoria being able to reach the Japanese market at least as quickly as the Japanese harvested product, and in better condition. The system embodying the invention also has the advantage that the shells and internal membranes (intestines etc.) removed from the shells may be disposed of overboard thereby removing the garbage disposal problems associated with existing processing systems.

In the subsequent processing steps, the roe is preferable placed on open mesh racks for draining and then immersed in a bath of alum solution for the removal of foreign matter and any remaining saline solution. The row is then drained and packaged in transporting trays in which the roe is transported, under refrigerated conditions, to the eventual consumer.

The other object of the present invention is to provide an improved shell cracking tool which may be used in the above processing system or to improve existing processing systems.

In a second aspect, the invention provides a tool for cracking the shells of sea urchins and like shelled creatures characterised by a blade formed with a central recess which enables the blade to penetrate the shell of the sea urchin in the region of the mouth thereof without causing significant damage to the internal organs or roe of the sea urchin.

In use, the blade is driven towards the mouth of the urchin and penetrates the shell sufficiently to crack the shell. The shell is then opened either by further driving the blade into engagement with the shell or by levering the blade in one direction while holding one part of the shell against movement.

In one embodiment of the invention, the shaft is mounted on a pivoting support and the shell is held by means of a fixed holder having a prong which engages in the mouth of the urchin. The shaft is slidable in the support and may be manually, mechanically, pneumatically, hydraulically or electrically driven downwardly to crack the shell of the sea urchin held by the prong. Following the initial downward movement, the support is pivoted away from the prong to break the shell open.

Alternatively, the blade may be at least partially wedge shaped so that only downward movement of the shaft is necessary to both crack and break open the shell. With this arrangement, the shaft is preferably driven by a suitable mechanism to further mechanise the opening procedure, although the manual version of the above embodiment has been successfully tested without excessive operator fatigue.

Several preferred embodiments of the invention will now be described with reference to the accompanying drawings in which:

FIG. 1 is a perspective view of a first embodiment of the shell cracking tool;

FIG. 2 is a fragmentary side elevation of the tool of FIG. 1 showing the mode of operation thereof;

FIG. 3 is a perspective view of a modified shell cracking blade;

FIG. 4 is a perspective view of a modified shell cracking apparatus;

FIG. 5 is a front view of the apparatus of FIG. 4;

FIG. 6 is a side view of the apparatus system along the line 6—6 in FIG. 5;

FIG. 7 is a perspective view of a hand operated tool, and

FIG. 8 is a schematic flow diagram showing the various stages in the processing system embodying the invention.

Referring firstly to FIGS. 1 and 2 of the drawings, the shell cracking mechanism shown comprises a base member 1, which in use is securely attached to a bench or the like on a boat used for harvesting sea urchins, or elsewhere if desired, and to which support brackets 2 and 3 are attached to pivotally support a U-shaped frame 4 in the manner shown. The frame 4 is held in the position shown by means of springs 5 and a stop member 6 secured to the bracket 2.

The frame 4 supports a central vertically disposed bearing 7 which slidably receives a shaft 8 to which a shell cracking blade 9, to be described in further detail below, is attached by means of bolts 10. The shaft 8 is fitted with an adjustably positioned sleeve 11 which serves as a stop for a compression spring 12 surrounding the shaft 8 between the bearing 7 and the sleeve 11. The spring 12 maintains the shaft 8 in its uppermost position as shown in FIG. 1. The shaft 8 is fitted with a handle 13 by means of which the shaft may be pushed downwardly in the bearing 7 against the biasing force supplied by the spring 12.

The sea urchin cracking blade 9 is formed with two blade portions 14 and 15 on either side of central recess 16. The size of the recess 16 is such that the blade 9 passes to either side of the internal organs of the sea urchin connected to the mouth thereof when the blade is brought into engagement with the sea urchin in the manner to be described below. The operative portions of the blade 9 are the blade portions 14 and 15 which engage the hard shell portion of the sea urchin to form fractures or cuts in the shell.

A sea urchin shell holder 17 is also secured to the base member 1 by means of bolts 18. The holder 17 extends upwardly from a position located rearwardly of the frame 4 and extends into overlying relationship with the position normally adopted by the sea urchin. The free end of the holder 17 is formed with a pointed prong 19 which is positioned so as to engage one side of the mouth of the sea urchin in the manner shown in FIG. 2 of the drawings.

In use, the sea urchin is located under the holder 17, as shown in FIG. 2 of the drawings, with the prong 19 engaging one side of the mouth of the urchin. The blade 9 is then brought into engagement with the sea urchin shell by depression of the shaft 8 by means of the handle 13. The blade portions 14 and 15 cut or fracture the shell and while the blade 9 is still in engagement with the shell, the frame 4 is pulled towards the front of the base member 1 by means of the handle 13 in the manner shown in FIG. 2 of the drawings. In this way, one half of the shell is held by the prong 19 while the other half of the shell is effectively levered away by the movement of the blade 9.

Since the sea urchin shell is cracked or cut on either side of the mouth and the blade does not contact the internal organs of the urchin connected to the mouth, the shell is opened with the minimum possible damage occurring to the internal organs and thus the roe surrounding the internal organs next to the shell. In the prior art processing method, the tools used often pushed the internal organs into the shell as the shell was cracked and this tended to tear the row away from the inside of the shell thus bruising or otherwise damaging the roe and spoiling it for subsequent sale. Thus the mechanism embodying the invention not only increases the efficiency of the shell cracking operation but also significantly decreases the damage done to the roe during the shell cracking operation.

The modified blade 9a shown in FIG. 3 of the drawings represents one example of the many blade shapes that may be adopted for the urchin shell cracking operation. Notwithstanding its different overall shape, the blade is still provided with blade portions 14a and 15a on either side of a central recess 16a.

A modified form of shell cracking apparatus is shown in FIG. 4 of the drawings. The apparatus of this embodiment includes a shaped base member 20 which is pressed from metal or formed from suitable plastics material to include a flat portion 21 to which the supporting frame 22 of a shell cracking apparatus embodying the invention is secured, and a sloping portion 23 leading to a receptacle 24 into which the roe extracted from the cracked shells is deposited as described in further detail below. The receptacle 24 is preferably filled with saline solution (e.g. sea water) and includes a drain opening 25 to allow for cleaning. A water pervious container (not shown), of the general type which is known in the art, is preferably arranged in the receptacle 24 to receive the extracted roe and to enable transfer of the roe to the next stage in the processing operation.

The shell cracking apparatus of this embodiment comprises a fixed blade 30, similar to blade 9, mounted on a shaft 31 driven by a pneumatic cylinder 32 for movement from a raised position (FIG. 4) to an operative shell penetrating position (FIG. 5). A similar movable blade 33 is mounted on said fixed blade and is driven by a similar pneumatic cylinder 34 from an initial position (FIG. 4) to a shell cracking position (FIG. 6) in which the movable blade 33 is moved laterally with respect to the fixed blade 30.

The main pneumatic cylinder 32 is actuated by means of two interlocked manually operated switches 35 and 36, both of which must be actuated to cause operation of the blades 30 and 33. This ensures that the operator's hands are not near the shell when the blade is actuated thereby reducing the likelihood of accidents.

The small cylinder 34 is actuated by a microswitch 37, engaged by a follower 38 secured to the shaft 31, when the blades are in their shell penetrating position. Thus it is not until the blades have penetrated the shell that the switch 37 actuates the cylinder 34 to move the blade 33 laterally away from the blade 31 whereby the shell is fully opened. On release of the switches 35, the shaft 31 retracts and the blade 33 returns to its position adjacent the blade 31. When the blades 31,33 have returned to their elevated position, a further microswitch 39 is activated to ensure that both switches 35, 36 must be activated to cause operation of the device.

If desired, the shells may be cracked manually by means of a hand gripped tool shown in FIG. 7 of the drawings. The tool comprises a pair of blades 40 and 41, similar to the blades in the preceding embodiment, formed at or secured to the free ends of operating handles 42 and 43 which are pivoted together for parting movement perpendicular to the faces of the blades. A return spring 44 is arranged between the handles to return the handles and the blades to the position shown in the drawing after the shell has been opened. In this embodiment, the blades are manually driven to penetrate the shell and the blades are then parted by squeezing the handles together to open the shell as in the preceding embodiments.

Referring now to FIG. 7 of the drawings, a sea urchin processing system embodying the invention will now be described. In the preferred embodiment of the invention, the sea urchin shell cracking mechanism M is located on board the boat carrying the divers harvesting the sea urchins and is operated while the divers are collecting further sea urchins. In stage (a) of the system, the sea urchin shell is cracked open using the mechanism M. In stage (b), the shell halves are held by the operator and are flicked with a slight wrist action either into a bucket or overboard to remove the internal organs and other undesired material from the shell. The sea urchin roe is then scooped from the shell by means of a stainless steel spoon or the like and in stage (c) the roe is placed in a saline solution S which is located in a plastic storage bag B located in a supporting container. In the case of the mechanism shown in FIG. 4 of the drawings, the roe is directly deposited in the receptacle 24 and is subsequently transferred to a bag B or other holder in stage (c). The saline solution is preferably chilled by means of salt-containing ice blocks which reduces the melting rate of the ice. In stage (d) the bag B is packaged by means of a tie and stored in suitable cool storage means, such as insulated containers, and remain in a chilled environment until the shore processing works is reached. The sea urchin shells and internal membranes are disposed of overboard thereby reducing the garbage disposal problem.

When the bags B are returned to shore, the roe is unloaded onto stainless steel open mesh trays T for draining purposes (stage (e)). In this solution further foreign matter is cleaned off and the saline solution absorbed. In stage (g), the trays T are placed in racks for draining for approximately twenty minutes. In stage (h), polystyrene transporting trays P are positioned over the stainless steel trays T and in stage (j) the assembly is inverted and the stainless steel trays T removed. The roe is then ready for packaging in a suitable transport container for export under refrigerated conditions to the desired markets.

It will be appreciated from the above that the sea urchin shells are processed faster and more conveniently than in the prior art processing systems. As a result, the roe extracted from the sea urchins reaches its export market faster and in better condition than with prior art systems. As a result of the use of the mechanised shell cracker described, damage to the roe is substantially reduced and therefore the yield from the harvesting operation is increased. The number of processors employed in the on-shore processing operation is significantly reduced and accordingly the overall processing operation is far less costly than with the prior art systems.

I claim:

1. A tool for cracking the shells of sea urchins and like shelled creatures, characterised by a blade formed with a central recess which enables the blade to penetrate the shell of the sea urchin in the region of the mouth thereof without causing significant damage to the internal organs or roe of said sea urchin, said blade having cutting edges extending upwardly and outwardly from either side of said recess.

2. The tool of claim 1, further comprising means for restraining said shell and means for moving said blade laterally with respect to said restraining means to open said shell.

3. The tool of claim 2, wherein said blade is mounted at one end of a shaft mounted for generally vertical movement to penetrate a shell arranged below said blade, said restraining means including a nose portion which engages the shell in use and restrains it against movement in at least one direction, said shaft and blade being pivotally mounted to facilitate said lateral movement of said blade relative to said restraining means.

4. The tool of claim 2, wherein said restraining means comprises a fixed member mounted adjacent said blade and formed to engage said shell in the blade penetrating position of said tool, said blade moving means comprising a device for moving said blade laterally away from said fixed member.

5. The tool of claim 4 wherein said blade and said fixed member are secured to manually operable handles pivoted together to move said blade relative to said fixed member.

6. The tool of claim 4, wherein said fixed member is secured to a shaft and said blade is fixed to the operative member of a cylinder operable to cause said movement of said blade.

7. The tool of claim 6, wherein said shaft comprises the operative member of a further cylinder operable to move said blade and fixed member vertically to penetrate said shell, and means for operating said first mentioned cylinder when said blade and fixed member have penetrated said shell.

8. The tool of claim 4, wherein said fixed member is a further blade similar in shape to said blade, both of said blades being formed with cutting edges extending from either side of said recess.

* * * * *